United States Patent Office 3,377,143
Patented Apr. 9, 1968

3,377,143
DISPERSION-STRENGTHENED, LOW
MELTING POINT METALS
Guy B. Alexander, Wilmington, Del., assignor to E. I. du Pont de Nemours and Company, Wilmington, Del., a corporation of Delaware
No Drawing. Continuation-in-part of application Ser. No. 97,994, Mar. 24, 1961. This application Sept. 28, 1964, Ser. No. 399,836
6 Claims. (Cl. 29—182.5)

ABSTRACT OF THE DISCLOSURE

The creep-resistance of a metal selected from lead, tin, cadmium, indium, thallium, antimony and bismuth and alloys of these with each other, is improved by dispersion therein of 0.05 to 30% by volume of a particulate refractory filler having an average particle size of 2 to 150 millimicrons and a melting point above 400° C., the number of filler particles per unit volume of metal being such that $GA_fV^{1/3} = 12$ to $330$, where G is the filler density in gm./ml., $A_f$ is the filler surface area in m.²/gm., and V is the volume fraction of filler, the filler being calcium fluoride, barium fluoride, carbon, a metal oxide having a free energy of formation at 1000° C. of more than 60 kcal. per gm. atom of oxygen, or a water-insoluble metal sulfide having a free energy of formation at 1000° C. of more than 100 kcal. per gm. atom of sulfur.

Reference to related applications

This application is a continuation-in-part of my prior copending application Ser. No. 97,994, filed Mar. 24, 1961, as a continuation-in-part of my then copending application Ser. No. 697,798, filed Nov. 21, 1957, both of said prior applications now being abandoned.

This invention is concerned with decreasing the creep of metals which are of the group consisting of lead, tin, cadmium, indium, thallium, antimony, and bismuth and their alloys with each other. The improvement is accomplished by incorporating in the metal submicron-sized particles of a refractory filler from the group consisting of metal oxides, insoluble metal salts, and carbon.

More particularly the invention is directed to sintered metal compositions consisting of a dispersion of (a) a refractory filler in the form of substantially discrete particles having an average dimension of 2 to 150 millimicrons (mμ) and a melting point above 400° C. and being irreducible with hydrogen at 300° C. and selected from the group consisting of metal oxides, water-insoluble metals salts and carbon, said refractory filler being dispersed in (b) a metal selected from the group consisting of lead, tin, cadmium, indium, thallium, antimony and bismuth, and their alloys with each other, the composition having a surface area less than 10 square meters per gram (m.²/g.) and the volume loading of filler in the metal being from 0.05 to 30 percent.

The relatively low-melting, inactive metals, such as lead, are seriously handicapped for use as materials of construction by the fact that they "creep" under stress, particularly at elevated temperatures. Since dimensional stability is highly desirable if not actually essential in any material of construction lead has ben used only where its unique properties, such as corrosion resistance or radio-active radiation impermeability, make it the only feasible material.

The undesirable creep tendencies of low melting, inactive metals have long been recognized, and many efforts at improvement have been attempted. Up to the present time, however, no completely successful solution to this problem has been known.

Now according to the present invention the desired reduction in creep rates has been accomplished and compositions having substantially improved dimensional stability produced by incorporating into the metals particles of a refractory filler, the particles having an average dimension of from 2 to 150 mμ and being present in substantially discrete form. In a preferred aspect of the invention the filler particles are refractory oxides and are dispersed in a continuous matrix of the metal as discrete, individual particles in the stated size range.

The filler

In describing this invention the dispersed refractory particles will sometimes be referred to as "the filler." The word "filler" is not used to mean an inert extender or diluent; rather it means an essential constituent of the novel compositions which contributes new and unexpected properties to th emetalliferous product. Hence the filler is an active ingredient.

The filler must be a "refractory"—that is, difficult to fuse. If the filler particles melt or sinter they become aggregated and cannot thereafter be dispersed to the desired degree.

The filler must be in a finely divided state. The substantially discrete particles should have an average dimension in the range from 2 to 150mμ. Discrete particles in these size ranges are commonly referred to in terms of a single dimension, as if the particles were spherical. If a particle is not actually isometric an average of its length, width and breadth can nevertheless be used to express its particle size as a single figure—viz. one third of the sum of the three dimensions. When reference is made herein to particles "having an average dimension" in a specified range it is meant that the particles present have an average size, as expressed by said single average dimension, within the stated range.

The particle diameter of the refractory oxide filler particles can be calculated from a measurement of their surface area. Thus, for example, the metal component of a powder product of the invention is dissolved in an acid, or in bromine-methanol, leaving the filler oxide particles, which are recovered by coagulating, centrifuging, washing and drying. The surface area of the recovered oxide is then measured by the conventional BET method or its equivalent. From this surface area measurement, the mean particle diameter, D, is calculated from the expression:

$$D = \frac{6000}{fA_f}$$

where $f$ is the absolute density of the filler oxide particles in grams per milliliter and $A_f$ is their surface area in square meters per gram.

To improve creep resistance significantly the number of particles of filler per unit volume of metal should be above a certain minimum. This minimum requirement is met when the expression $GA_fV^{1/3}$ is greater than 12, where G is the density of the filler in gm./ml., $A_f$ is the surface area of the filler in m.²/gm., and V is the volume fraction of the filler. For products of the invention $GA_fV^{1/3}$ will be the range 12 to 330, preferably in the range 20 to 150. The surface area of the filler $A_f$ is determined as above indicated.

The particles should be dense and anhydrous for best results, but it will be understood that aggregates of smaller particles can be used, provided that the discrete particles of aggregate are within the above-mentioned dimensions. Particles which are substantially spheroidal or cubical in shape are also preferred, although anisotropic particles such as fibers or platelets can be used for special effects. Anistropic particles produce metal compositions of lower ductility, however, and in those instances where ductility is desired, particles approaching isotropic form are preferred.

The filler must have a melting point above 400° C. This acts mainly as a limitation on the kind of metal salts which can be used, since carbon and the irreducible oxides melt, if at all, at temperatures far above this figure. It will be remembered that some salts containing water of crystallization melt at temperatures which are low, relative to the melting point of the anhydrous salts, and in these situations the anhydrous salt may be usable even though the hydrate is not. However, since the salt must be water-insoluble to be suitable as a filler, there are relatively few instances of this kind.

The filler in the novel composition is irreducible with hydrogen at 300° C. Carbon, of course, being already in a reduced state, is not further reducible. The metal oxides and salts which are suitable are not reduced by contact with gaseous hydrogen even at a temperature up to 900° C. It is a simple matter to run such a test on a proposed filler and analyze the product; if any reduction has occurred, the filler is outside the scope of this invention.

Among the salts which answer the foregoing requirement of irreducibility are metal sulfides having a free energy of formation ($\Delta F$) at 1000° C. of more than 100 kilocalories per gram atom of sulfur (kcal./gm. at. S) Among water-insoluble salts which can be used are calcium fluoride, barium sulfide, cerium sulfide and barium fluoride. Preferably the water solubility will be not more than 0.01 percent by weight at 25° C.

A preferred class of fillers are the irreducible metal oxides. These have a $\Delta F$ at 1000° C. of more than 60 kcal./gm. at. O.

Mixed oxides can be used as fillers, particularly those in which each oxide in the mixed oxide conforms to the melting point and free energy of formation requirements above-stated. Thus, magnesium silicate, $MgSiO_3$, is considered as a mixed oxide of $MgO$ and $SiO_2$. Each of these oxides can be used separately; also, their products of reaction with each other are useful. By "dispersion of an oxide" is meant a dispersion containing a single metal oxide or a reaction product obtained by combining two or more separate oxides. Also, two or more products of the invention. The term "metal oxide filler" broadly includes spinels, such as $MgAl_2O_4$ and $ZnAl_2O_4$, metal carbonates, such as $BaCO_3$, metal aluminates, metal silicates such as magnesium silicate and zircon, metal titanates, metal vanadates, metal chromites, and metal zirconates. With specific reference to silicates, for example, one can use complex structures, such as sodium aluminum silicate, calcium aluminum silicate, calcium magnesium silicate, calcium chromium silicate, and calcium silicate titanate.

Typical single oxides which are useful as the filler include silica, alumina, zirconia, titania, magnesia, hafnia, and the rare earth oxides including thoria. A typical group of suitable oxides, and their free energies of formation is shown in the following table:

| Oxide: | $\Delta F$ at 1000° C. |
|---|---|
| $Y_2O_3$ | 125 |
| $CaO$ | 122 |
| $La_2O_3$ | 121 |
| $BeO$ | 120 |
| $ThO_2$ | 119 |
| $MgO$ | 112 |
| $UO_2$ | 105 |
| $HfO_2$ | 105 |
| $CeO_2$ | 105 |
| $Al_2O_3$ | 104 |
| $ZrO_2$ | 100 |
| $BaO$ | 97 |
| $ZrSiO_4$ | 95 |
| $TiO$ | 95 |
| $TiO_2$ | 85 |
| $SiO_2$ | 78 |
| $Ta_2O_5$ | 75 |
| $V_2O_3$ | 74 |
| $NbO_2$ | 70 |
| $Cr_2O_3$ | 62 |

Colloidal metal oxide aquasols are particularly useful as a means of providing the fillers in the desired finely divided form. Thus, for example, silica aquasols such as those described in Bechtold et al. U.S. Patent 2,574,902, Alexander U.S. Patent 2,750,345, and Rule U.S. Patent 2,577,485 are suitable as starting materials in processes of this invention. Zirconia sols are likewise useful. The art is familiar with titania sols, and such sols as described by Weiser in "Inorganic Colloidal Chemistry," vol. 2, "Hydrous Oxides and Hydroxides," for example, can be used to advantage.

Although they are less preferred, aerogels and reticulated powders can also be used. For example, products described in Alexander et al. U.S. Patent 2,731,326, can be employed, but in these instances it is necessary that the aggregate structures be broken down at some point in the process to particles in the size range specified.

Powders prepared by burning metal chlorides, as, for example, by burning silicon tetrachloride, titanium tetrachloride, or zirconium tetrachloride to produce a corresponding oxide, are also very useful if the oxides are obtained primarily as discrete, individual particles, or aggregated structures which can be dispersed to such particles. However, because colloidal metal oxide aquasols already contain particles in the most desirable size range and state of subdivision, these are preferred starting materials for use as a filler.

The metal

The metal in which the refractory filler is dispersed in a composition of this invention has a melting point between 100 and 650° C. and stands below iron in the electromotive series. A plurality of such metals can, of course, be present.

In addition to answering the above description, the metal is selected from the group consisting of lead, tin, bismuth, cadmium, indium, thallium and antimony, and alloys of these metals with each other.

Making the compositions

Compositions of this invention can be made by processes in which a relatively large volume of a reducible oxide, hydroxide, hydrous oxide, oxycarbonate, hydroxycarbonate, or, in general, an oxygen-containing compound of the low-melting metal, such as lead, tin or bismuth, is deposited around the filler, and the deposited compound is reduced to metal, as by heating in hydrogen. This deposit may be a single metal oxide or it may contain oxides of two or more metals. Thus, the hydrous oxides of both lead and tin may be deposited around a filler; in this way, an alloy of lead and tin is produced directly during the reduction step.

The hydrous oxygen-containing compound of low-melting metal can be precipitated from a soluble salt of the metal, preferably a metal nitrate, although other soluble metal salts, such as acetates, can be used. Thus lead nitrate, tin nitrate, and bismuth nitrate are among the preferred starting materials.

The precipitation can be accomplished conveniently by adding a soluble salt of the metal such as lead, tin, or bismuth to an aqueous solution containing the filler particles, while maintaining the pH of the solution about neutral. A preferred way to do this is to add, simultaneously but separately, the solution of the metal salt, the colloidal aquasol containing the filler particles, and an alkali such as sodium hydroxide, to a heel of water. Care should be used to avoid excess algali, since the metal hydroxides are soluble in alkaline solutions. Alternatively, a dispersion containing the filler particles can be used as a heel, and the metal salt solution and alkali added simultaneously but separately thereto.

As the alkali used for maintaining or raising the pH of the reaction mixture above the neutral point any basic material can be employed. Hydroxides such as NaOH, KOH, or ammonia, or carbonates such as $(NH_4)_2CO_3$, $Na_2CO_3$ or $K_2CO_3$ are especially satisfactory. The metal compound deposited will be an oxide, hydroxide, hydrous oxide, oxycarbonate, or in general, a compound which, on heating, will decompose to the oxide.

It is preferred that the filler particles be completely coated with the reducible oxygen compound of low-melting metal, so that when reduction occurs later in the process, aggregation and coalescence of the filler particles is avoided. In other words, it is preferred that the ultimate particles of the filler be not in contact, one with another, in the coprecipitated product. A condition which is important during the process to insure this result is to use vigorous mixing and agitation.

Having deposited the oxygen compound of low-melting metal on the filler, it is then desirable to remove the salts formed during the reaction, as by washing. Ordinarily, one uses an alkali such as sodium hydroxide, potassium hydroxide, lithium hydroxide, ammonium or tetramethylammonium hydroxide in the deposition of the compound. As a result, salts such as sodium nitrate, ammonium nitrate or potassium nitrate are formed. These should be removed, since otherwise they may appear in the final product. One of the advantages of using the nitrate salts in combination with aqueous ammonia is that ammonium nitrate is volatile and therefore is easily removed from the product merely by heating.

After essentially removing the soluble non-volatile salts, the product can be dried, at a preferred temperature of about 100° C. Alternatively, the product can be dried, and the dry material suspended in water to remove the soluble salts, and thereafter the product redried.

Ordinarily, a relatively large amount of the oxygen compound of low-melting metal will be applied as a coating to a relatively small amount of filler. The amount of coating material will vary somewhat with the particle size of the filler, the particle shape, and especially with the surface area thereof. In products of the invention, the volume loading of filler in the final metal composition is from 0.05 to 30%. With smaller filler particles, having a surface area greater than $200/D$ m.$^2$/g. (D being the density of the filler in g./ml.), or with anisotropic particles, volume loadings of from 0.05 to 5% are preferred. In an especially preferred case, the relative amounts used are such that from 0.1 to 5 volume percent of filler will be present in the final metal-filler composition after reduction. With relatively large particles—those, for example, in the size range of about 100 millimicrons— one can use volume loadings as high as 20% or even 30%. At such loadings, using low-density fillers, the density of lead can be somewhat reduced.

The next step in making a composition of the invention is to reduce the precipitated coating on the filler to the metal. This can be done conveniently by subjecting the coated particles to a stream of hydrogen at a somewhat elevated temperature. However, the temperature should not be allowed to exceed the melting temperature of the metal coating, and preferably is held below about 200° C. in the case of tin and bismuth and 300° C. in the case of lead. To accomplish this, the product is placed in a furnace at controlled temperature, and hydrogen gas is added slowly. Under these conditions the reduction reaction will not proceed so rapidly that large amounts of heat are liberated and the temperature in the furnace is unduly increased.

In addition to, or instead of, hydrogen, carbon monoxide can be used as the reducing agent, as well as methane or other hydrocarbon gases. In any case, it is important that the temperature during reduction be controlled to avoid melting of the metal formed.

Reduction should be continued until the coating is essentially reduced. When using oxides as fillers, the reduction should be continued until the oxygen content of the mass corresponds to not more than two times the oxygen content of the oxide filler material. Preferably, the oxygen content will be from 1.0 to 1.2 times the oxygen content of the original filler material.

Following the reduction step the entire mass of metal and oxide is sintered and/or compacted, at least until the surface area is less than 10 m.$^2$/g. This can be done by subjecting the product to very high pressures, preferably at temperatures equivalent to about ⅔ of the absolute melting point of the metal coating. In some instances, it is desirable to heat the product during this pressing operation to temperatures just slightly below the melting point. In order to obtain a strong bond between the particles of the finely divided reduced powder, it may be desired to hot- or cold-work the resulting composition, as, for example, by rolling, hot extruding or similar techniques well known in the metallurgical art. The product preferably is compacted until it has reached at least 90% of theoretical density—that is, until the apparent density is from 90 to 100% of the absolute density.

The novel products

The novel compositions of this invention comprise dispersions of the filler particles in the metals described. The art is familiar with the fact that grains can be recognized in a mass of solid metal. In products of this invention the filler particles in the metal grains are uniformly dispersed—that is, the particles are found both at the grain boundary and inside the grain.

This dispersion can be demonstrated, using the electron microscope and replica techniques wherein the surface of a metal piece is polished, a carbon layer is deposited on the polished surface, and the metal is removed, as by dissolving in acid. An electron micrograph of the remaining carbon film shows that the filler particles are uniformly distributed throughout the metal grains. Because of this, useful metal parts can be made by directly compacting the metal-metal oxide powders as prepared by the invention. This eliminates the necessity of working in order to improve dispersion.

By "uniformly dispersed" is meant that there is uniform distribution of the refractory oxide particles within any single selected microscopic region of treated metal, such regions being about 10 microns in diameter.

The products of the invention are uniform dispersions of filler particles in metals. By uniform is meant that the oxide is distributed essentially homogeneously throughout the metal, and the oxide is present inside the grains as well as at the grain boundaries. Specifically, if one examines an electron micrograph prepared by the carbon replica technique, one will find that the ratio of the concentration of oxide particles along the grains to the concentration of oxide in the sample is less than 10:1 and specifically in the range from 0.1:1 to 10:1. Often, the grains in the compositions of the invention are so small that grain boundaries are difficult to find.

Such a measurement can be made as follows: Prepare a micrograph by the carbon replica method, and select an area typical of grain boundaries. Measure an area along said grain for a distance of 100D, where D is the number average particle size, and 2D wide on either side of the grain, i.e., an area of $400D^2$. Count all the particles in this area; let this number be $N_1$. Measure another representative area 20D on each side, preferably inside a grain, and at a distance at least 2D away from any grain boundary, i.e., an area $400D^2$ which is a square. Count all the particles in this area, $N_2$. $N_1/N_2$ will be in the range of 0.1:1 to 10:1 for products of the invention.

In describing products of this invention an oxide filler particle is defined as a single coherent mass of oxide surrounded by metal and separated from other oxide mass by metal. The particles may be aggregates of smaller ultimate units, which are joined together to form a structure.

The particles of the filler in compositions of the invention are surrounded by a metal coating which maintains them separate and discrete. The particles are thus isolated, and do not come in contact one with another; thus, coalescence and sintering of the filler material is prevented.

Included as compositions of the invention, in addition to the filler-modified single metal, are filler-modified alloys comprising a plurality of the above-designated metals, having a melting point between 100 and 650° C. Such alloys can be prepared, for instance, by powder metallurgy techniques wherein the metal powders contain filler particles. Alternatively, a plurality of metals may be coprecipitated and reduced in the presence of the filler particles as above-described.

Specifically, the modified alloys include, for instance, bearing metals, e.g., 11 Sn, 75 Pb, 14 Sb or 2 Sn, 83 Pb, 15Sb; Britannia metal 90 Sn, 10 Sb; solder 50 Sn, 50 Pb; pewter 80 Sn, 20 Pb; hard metal 90 Pb, 10 Sb; type metal 82 Pb, 15 Sb, 3 Sn; and Rose metal 50 Bi, 27 Pb, 23 Sn.

Volume loadings of filler in the novel compositions are in the range of from 0.05 to 30%, and preferably in the range below 5%. When volume loadings larger than 5% are used, the resulting composition is not nearly as ductile as the original metal, and therefore is somewhat difficult to work.

Compositions of the invention, in addition to having substantially increased resistance to creep, in many instances have increased strength, especially at elevated temperatures. The products are especially useful for rolling into sheets to be used for fabrication into tanks, shields against radio-active radiation, and the like.

The invention will be better understood by reference to the following illustrative examples.

EXAMPLE 1

A solution of lead nitrate was prepared by dissolving 400 g. of lead nitrate, $Pb(NO_3)_2$, in water and diluting this to 1 liter. An alumina sol, prepared by burning aluminum trichloride in an oxidizing flame and dispersing the resultant alumina in dilute hydrochloric acid, said sol containing substantially discrete particles having an average diameter of about 25 millimicrons, was used as the source of the filler material. A 128 g. portion of this colloidal aquasol (8% $Al_2O_3$) was diluted to 1 liter. To a heel containing 1 liter of water at 40° C., the solution of lead nitrate, the diluent alumina sol, and 2.5 N ammonium hydroxide were added as separate solutions, simultaneously, and at uniform rates, while maintaining very vigorous agitation. A coating of lead hydroxide was thus deposited around the alumina particles. The resulting mixture was filtered, and washed to remove the ammonium nitrate. The filter cake was fired in an oven at 110° C. to remove substantially all of the water.

The product obtained was placed in an oven at a temperature of 250° C. Hydrogen was slowly passed over the powder at such a rate that sufficient hydrogen was added to the lead oxide to reduce it in a period of four hours. The flow of hydrogen was maintained at a steady uniform rate during this reduction procedure for eight hours. Thereafter, the temperature was raised to 275° C. (maximum temperature) while maintaining the flow of hydrogen at the same rate. The resulting powder contained 10 volume percent alumina. This powder was compressed in a 1-inch die at 20 tons per square inch, sintered at 275° C. in hydrogen, and finally extruded at 250° C. to form a wire, using an area reduction ratio of 10:1 during extrusion. This modified lead wire was extremely creep resistant and considerably harder than unmodified lead.

EXAMPLE 2

A process of Example 1 was repeated except that a solution of aluminum nitrate was used in place of the sol. As a result, a billet of lead containing 2.0% $Al_2O_3$ (by volume) was prepared. The alumina was present in the lead as discrete particles.

EXAMPLE 3

In this example, a colloidal aquasol containing 150 millimicron silica particles was used in place of the alumina sol of Example 1. The product was lead containing 5 volume percent $SiO_2$. This lead powder so obtained was pressed into a dense, hard billet of lead, said product being considerably harder than unmodified lead.

EXAMPLE 4

This example is similar to Example 1, except that an aquasol of a fibrous colloid of AlOOH was used. The AlOOH particles were about ½ to 1 micron long and about 10 millimicrons in cross section. An alloy of 10 volume percent of AlOOH in Pb was prepared.

EXAMPLE 5

A process similar to that of Example 1, except that instead of lead nitrate the stoichiometric equivalent amount of stannous chloride is used, gives a wire product composed of alumina-modified tin having improved creep resistance.

EXAMPLE 6

Example 1 is repeated, using bismuth nitrate instead of lead nitrate. The wire product has improved creep resistance.

EXAMPLE 7

A process of Example 1 is repeated, except that instead of the alumina sol, a weight of $SiO_2$ equal to the weight of $Al_2O_3$, in the form of a silica sol prepared as described in Example 3 of Bechtold and Snyder U.S. Patent 2,574,902, is used as the source of the refractory filler. The wire product has improved creep resistance.

I claim:

1. A metal composition consisting of a metal component selected from the group consisting of lead, tin, cadmium, indium, thallium, antimony and bismuth, and alloys of said metals with each other, said component having improved creep resistance by reason of having dispersed therein from 0.05 to 30% by volume of a refractory filler in the form of substantially discrete particles having an average dimension of 2 to 150 millimicrons and a melting point above 400° C., the number of particles of filler per unit volume of metal being such that the expression $GA_fV^{1/3}$ has a value in the range from 12 to 330, where G is the density of the filler in grams per milliliter, $A_f$ is the surface area of the filler in square meters per gram, and V is the volume fraction of the filler, the filler being selected from the group consisting of metal oxides having a free energy of formation at 1000° C. of more than 60 kcal. per gram atom of oxygen, water-insoluble metal sulfides having a free energy of formation at 1000° C. of more than 100 kcal. per gram atom of sulfur, calcium fluoride, barium fluoride and carbon, the composition having a surface area less than 10 square meters per gram.

2. A metal composition consisting essentially of a metal component selected from the group consisting of lead, tin, cadmium, indium, thallium, antimony and bismuth, and alloys of said metals with each other, said metal component having improved creep resistance by reason of having dispersed therein from 0.05 to 30% by volume of a refractory filler in the form of substantially discrete particles having an average dimension of 2 to 150 millimicrons, the number of particles of filler per unit volume of metal being such that the expression $GA_fV^{1/3}$ has a value in the range from 12 to 330, where G is the density of the filler in grams per milliliter, $A_f$ is the surface area of the filler in square meters per gram, and V is the volume fraction of the filler, the filler being a metal oxide having a melting point above 400° C. and a free energy of formation at 1000° C. of more than 60 kcal. per gram atom of oxygen, and the composition having a surface area less than 10 square meters per gram.

3. A composition of claim 2 in which the metal is lead.

4. A composition of claim 2 in which the metal is lead-base alloy.

5. A composition comprising lead metal having improved creep resistance by reason of having dispersed therein alumina in the form of substantially discrete particles having an average dimension of 2 to 150 millimicrons, the number of particles of filler per unit volume of metal being such that the expression $GA_fV^{1/3}$ has a value in the range from 12 to 330, where G is the density of the filler in grams per milliliter, $A_f$ is the surface area of the filler in square meters per gram, and V is the volume fraction of the filler, the composition having a surface area less than 10 square meters per gram and an apparent density which is from 90 to 100 percent of the absolute density of the lead, and the volume loading of alumina being from 0.5 to 30 percent.

6. A composition comprising lead metal having improved creep resistance by reason of having dispersed therein silica in the form of substantially discrete particles having an average dimension of 2 to 150 millimicrons, the number of particles of filler, per unit volume of metal being such that the expression $GA_fV^{1/3}$ has a value in the range from 12 to 330, where G is the density of the filler in grams per milliliter, $A_f$ is the surface area of the filler in square meters per gram, and V is the volume fraction of the filler, the composition having a surface area less than 10 square meters per gram and an apparent density which is from 90 to 100 percent of the absolute density of the lead, and the volume loading of silica being from 0.5 to 30 percent.

References Cited
UNITED STATES PATENTS

| | | | |
|---|---|---|---|
| 2,985,571 | 5/1961 | Binstock et al. | 29—182.5 |
| 2,992,178 | 7/1961 | Lustman et al. | 29—182.5 |
| 3,085,876 | 4/1963 | Alexander et al. | 29—182.5 |
| 3,150,443 | 9/1964 | Alexander et al. | 29—182.5 |
| 3,189,989 | 6/1965 | Ebdon | 75—206 |

L. DEWAYNE RUTLEDGE, *Primary Examiner.*

CARL D. QUARFORTH, *Examiner.*

R. L. GRUDZIECKI, *Assistant Examiner.*